3,121,645
2-IMINO-1,3-DI-N-HETEROCYCLES

Jakob Bindler, Riehen, near Basel, Ernst Model, Basel, and Robert Zinkernagel, Riehen, near Basel, Switzerland, assignors to J. R. Geigy A.-G., Basel, Switzerland
No Drawing. Filed Jan. 20, 1959, Ser. No. 787,829
Claims priority, application Switzerland Dec. 28, 1956
8 Claims. (Cl. 117—138.5)

The present invention concerns a process for the production of new heterocyclic nitrogen compounds which have proved to be valuable protective agents against microorganisms. It also concerns the use of such compounds for the protection of organic material of all kinds as well as the material protected with these agents.

It has been found that 2-imino-1,3-di-N-heterocycles of the general formula:

$$R_1-N\overset{A}{\underset{\underset{NH}{\overset{\|}{C}}}{\diagdown\diagup}}N-R_2 \quad (I)$$

are valuable protective agents against bacteria and fungi. In the above formula:

$R_1$ represents a lipophilic radical preferably selected from the group consisting of dodecylbenzyl and $C_{12}$ to $C_{14}$ alkyl radicals, $R_2$ represents hydrogen or a low molecular alkyl, a cycloalkyl, a benzyl or a chlorobenzyl radical, A represents a divalent saturated hydrocarbon radical implementing the heterocyclic ring, in which $\alpha,\beta$- or $\alpha,\gamma$-carbon atoms are bound to the two nitrogen atoms. This divalent radical can be of the aliphatic or the cycloaliphatic series and is chiefly an $\alpha,\beta$- or $\alpha,\gamma$-alkylene or a 1,2-cycloalkylene group.

By the expression "lipophilic radical," such groups are meant which increase the solubility in fat or oil, i.e. chiefly saturated hydrocarbon radicals having at least 10 carbon atoms.

The new substances according to the present invention are produced by reacting diamino compounds of the general formula:

$$R_1\text{—NH—A—NH—}R_2 \quad (II)$$

wherein $R_1$, $R_2$ and A have the meaning given above, with cyanogen halide, in particular with cyanogen chloride and bromide. The reaction which is known per se is most simply performed by adding the cyanogen halide to a solution of the diamino compound in an inert organic solvent such as, for example, benzene, toluene, chlorobenzene, cyclohexane, if necessary while warming the reaction mixture. On using diamino compounds of the Formula II in which $\alpha,\beta$-carbon atoms of the radical A are bound to the two nitrogen atoms, hydrohalic acid salts of N-substituted 2-iminoimidazolidines are obtained as reaction products which may be further substituted by alkyl or alkylene groups at the 4- and/or 5-positioned carbon atoms of the heterocycle. The corresponding 2-imino-hexhydropyrimidine derivatives are obtained on using aliphatic diamino compounds which contain the amino groups at $\alpha,\gamma$-carbon atoms.

Examples of diamino compounds of the general Formula II which can be used in the process according to the present invention are chiefly nitrogen-substituted $\alpha,\beta$-diaminoalkanes and cycloalkanes such as, e.g. N-derivatives of 1,2-diaminoethane, 1,2-diaminopropane, 1,2- and 2,3-diaminobutane, 1,2-diaminocyclopentane, 1,2-diaminocyohexane as well as N-derivatives of $\alpha,\gamma$-diaminoalkanes, e.g. those of 1,3-diaminopropane and 1,3-diamino-2-methyl propane. The following individual compounds of the general Formula II are useful: N-dodecyl-N'-ethyl-1,2-diaminoethane, N - dodocyl - N' - β - hydroxyethyl - 1,2-diaminoethane, N-tetradecyl - N' - methyl-1,3-diaminoethane, N-cyclohexyl-N'-dodecyl-1,2-diaminoethane, N-cyclohexyl - N' - tetradecyl - 1,2 - diaminoethane, N - dodecyl-N' - methyl - 1,3 - diaminopropane, N - cyclohexyl - N'-dodecyl - 1,3 - diaminopropane, N - dodecyl - N' - methyl-1,2 - diaminocyclohexane and N - cyclohexyl - N'-dodecyl-1,2-diaminocyclohexane. In view of the bactericidal properties of the compounds according to the present invention obtained therefrom, of particular interest are such $\alpha,\beta$- or $\alpha,\gamma$-diaminoalkanes or cycloalkanes which only contain one nitrogen substituent, i.e. a lipophilic radical such as preferably a $C_{12}$ to $C_{14}$ alkyl radical. Examples are, N-dodecyl-1,2-diaminoethane, N-tetradecyl-1,2 - diaminoethane, N - dodecyl - 1,2 - diaminopropane, N - tetradecyl - 1,2 - diaminocyclohexane and N - dodecyl-1,2-diaminocyclohexane.

Of particular value are also starting products of the general Formula II in which $R_1$ is a possibly chlorine-substituted benzyl radical and $R_2$ is a lipophilic aliphatic group, for example N-tetradecyl-N'-benzyl-1,2-diaminoethane, N - dodecyl - N' - (p - chlorobenzyl) - 1,2 - diaminoethane, N - dodecyl - N' - (3,4 - dichlorobenzyl)-1,2-diaminoethane, N - dodecyl - N' - (p - chlorobenzyl)-1,2 - diaminocyclohexane and N-dodecyl-N'-benzyl-1,3-diaminopropane. However, such compounds are also valuable which contain a lipophilic radical bound at the benzyl group, for example N - (p -dodecylbenzyl) - 1,2 - diaminoethane, N - (p - dodecylbenzyl) - 1,2 - or - 1,3 - diaminopropane, N - (p - dodecylbenzyl) - N' - benzyl-1,2-diaminoethane, N - (p - dodecylbenzyl) - N' - cyclohexyl-1,2 - diaminoethane, N - (p-dodecylbenzyl) - N' - ethyl-1,2 - diaminopropane, N - dodecylbenzyl - 1,2 - diaminoethane, N - dodecylbenzyl - 1,2 - diaminopropane, N-dodecylbenzyl-1,3-diaminopropane.

Salts of 2-imino-1,3-di-N-heterocycles are obtained by reacting the diaminoalkane or cycloalkane compounds with cyanogen halide. The free bases are obtained therefrom with caustic alkalies, from which bases the most various salts can be produced by means of acids or acid compounds. Inorganic acids can be used such as, for example, sulphuric acid, nitric acid, phosphoric acid, halogen hydracids, but also organic acids or hydroxyl compounds which react like such acids can be used, e.g. formic acid, acetic acid, chloroacetic acid, propionic acid, oxalic acid, succinic acid, lactic acid, salicylic acid, resorcylic acid, phenoxyacetic acid and toluene sulphonic acids.

A modification of the process according to the present invention for the production of 2-imino-1,3-di-N-heterocycles consists in reacting cyanogen halide with a diamino compound of the general formula:

$$H_2N\text{—A—NH—R} \quad (III)$$

wherein

A has the meaning given above, and

R represents one of the two N-substituents $R_1$ and $R_2$ defined above or hydrogen, and alkylating the resultant heterocyclic compound to introduce the desired N-substituent. If, in Formula III, R represents one of the two substituents $R_1$ and $R_2$, then after closing the ring the other N-substituent is introduced by alkylation. Diamino compounds which are substituted by a low molecular alkyl radical or a cyclohexyl radical are used advantageously as starting materials. The lipophilic aliphatic radical is then introduced into the heterocyclic compound by alkylation. If diamino compounds of the Formula III in which R represents hydrogen are used as starting materials, then the radical $R_1$ or the radicals $R_1$ and $R_2$ must be introduced into the heterocyclic compound unsubstituted at the ring nitrogen atoms, the introduction being performed in the latter case in steps and in any order desired.

Chiefly higher molecular alkyl halides, for example alkyl chlorides or alkyl bromides having at least 10 and advantageously 12 to 14 carbon atoms in the alkyl radical can be used in the process according to the present invention as agents introducing a lipophilic radical. Also the alkali metal salts of corresponding fatty alcohol monosulphates can be used. It is also possible to perform the reaction in the presence of the usual accelerators, for example in the presence of iodine. On introducing the lipophilic radical it is advantageous to use about the stoichiometrical amount of the alkylating agent or, possibly, a slight excess because often some dialkyl derivative is also formed. The same is true for the introduction of a low molecular alkyl radical.

Alkyl halides such as methyl, ethyl, n-propyl, isopropyl, n-butyl, sec. butyl chloride, bromide or iodide; dialkyl sulphates such as dimethyl or diethyl sulphate and alkyl esters of aromatic sulphonic acids for example p-toluene sulphonic acid methyl or ethyl ester can be used as agents introducing low alkyl radicals.

The reaction of the heterocyclic nitrogen compounds with the alkylating agents can be performed by mixing the components direct or in organic dilution. Alcohols such as methanol, ethanol, butanol 2-methoxy or 2-ethoxy ethanol; ethers such as dibutyl ether, dioxan, anisol; low ketones such as acetone, methyl ethyl ketone, dibutyl ketone; aromatic hydrocarbons such as benzene, toluene, xylene; chlorinated hydrocarbons such as chlorobenzene, chlorotoluenes can be used as organic solvents and diluents. The reactions are generally performed at a raised temperature, for example at 50° C. to 150° C. The reaction products are obtained direct as water soluble salts with the acid originating from the alkylating agent. They precipitate direct from unpolar organic solvents; they can be precipitated from polar organic solvents generally with the help of aliphatic or alicyclic hydrocarbons.

Some of the diamino compounds of the Formulae II and III used as starting products are known, others can be produced by known methods from known starting materials. Thus for example, diprimary diaminoalkanes or cycloalkanes can be reacted with alkyl halides, possibly while protecting the one amino group by previous acylation. Another type of production process consists in condensing aliphatic aldehydes with diamino compounds containing at least one primary amino group to form the corresponding Schiff's base which is then catalytically hydrogenated. Both mono- as well as di-substituted compounds can be produced by both types of process.

The 2-imino-1,3-di-N-heterocycles produced according to the present invention are colourless to weakly coloured, crystalline to wax-like substances which are stable to light and which, in the form of their salts, dissolve very easily in water. The compounds are valuable biocides which are distinguished by their great range of action particularly good bactericidal and also however, fungicidal or fungistatic action. They also have a good algaecidal action. The agents can be used alone as powders, in solution or in dispersion or admixed with other substances such as inert carriers or fillers, cleansers, ointment bases, creams, other bactericidal and fungicidal substances etc. They can be used for the most various purposes. For example they are good disinfectants and antiseptics for use in human or veterinary medicine as they have a good to very good action against staphylococci, coli, typhus, paratyphus and enteritis bacilli as well as against pathogenic fungi such as, for example *Ctenomyces interdigitalis*. Because of their good water solubility, the new compounds can also be used advantageously for the disinfectant and antiseptic treatment of textiles, for example, blankets, restaurant and hotel linen. Textile fabrics treated with a 1 to 2% aqueous solution of the compounds according to the present invention are not only free from germs after drying but have certain long lasting properties of a bacteriostatic and fungistatic nature. Textiles so treated do not become yellowish on long storage or exposure to light. The compounds can also be applied to textiles in organic solutions such as are used, for example in so-called dry cleaning. For this purpose, the free bases which are soluble in organic solvents are used advantageously. Also the compounds according to the present invention can be used for room disinfection, that is for the elimination to a great extent of micro-organisms present in a closed room. They are used for this purpose chiefly in the form of sprays and aerosols. The new antibacterial agents can also be used for the disinfection of apparatus and equipment in the household or in the foodstuff and fermentation branches of industry, and finally, another form of application is in cosmetics where they are used, for example, in the form of ointments and creams.

Further particulars can be seen from the following examples which, however, do not limit the invention in any way. In these examples the parts are given as parts by weight and the temperatures are in degrees centigrade. The relationship of parts by weight to parts by volume is as that of kilogrammes to litres.

EXAMPLE 1

*1-Dodecyl-2-Imino-Imidazolidine Bromohydrate*

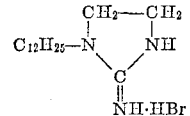

114 parts of N-dodecyl-1,2-diaminoethane which has already been described in the literature are boiled in 600 parts of benzene. At boiling temperature a solution of 53 parts of cyanogen bromide in 500 parts of benzene is added dropwise over a period of 3 hours. On completion of the addition, the whole is stirred for another two hours at the same temperature. The clear, dark solution is filtered, the benzene is distilled off in the vacuum and the residue is dissolved in acetone. After filtering over animal charcoal ether is added to the acetonic solution whereupon the 1-dodecyl-2-imino-imidazolidine bromohydrate separates as a white precipitate. The product dissolves very easily in water, alcohol and acetone and melts at 106–107°.

*Analysis.*—Calculated: 12.58% N, 23.95% Br. Found: 12.35% N, 23.70% Br.

The 2-imino-1-tetradecyl imidazolidine bromohydrate can be produced in a similar way. A white product which dissolves easily in water and which melts at 149–151° is obtained.

Both products have a very good bactericidal and fungicidal action. They are effective for example against the following bacteria: Staphylococci spec. *aureus* and *albus, Escheria coli, Eberthella typhosa, Salmonella paratyphi, Salmonella schottmülleri, Salmonella enteritidis, Salmonella typhimurium*, Penicillium species and *Fusarium oxysporum*. They are also very active against the pathogenic fungi *C. interdigitalis*. They can be used therefore as active ingredient of disinfectants, for example in the form of ointments, tinctures, as additives to cleansing agents and in materials for antiseptic bandages.

EXAMPLE 2

*1-Dodecyl-2-Imino-Imidazolidine Chlorohydrate*

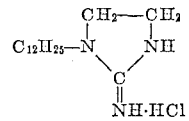

48 parts of N-dodecyl-1,2-diaminoethane are dissolved in 120 parts of benzene and 14 parts of cyanogen chloride are introduced into this solution at room temperature. The temperature is kept at 20–30° by external cooling. Towards the end of the reaction, the base disappears and the solution has a weakly acid reaction. The 2-imino-1-dodecyl-imidazolidine chlorohydrate gradually separates out of the solution. The reaction mixture is evaporated to dryness in the vacuum and the resultant pale brownish powder is recrystallised from acetone and from ethyl acetate. A white powder is obtained which melts at 119–120°. The chlorohydrate has similar bactericidal and fungicidal properties to the bromohydrate described in Example 1. It dissolves completely in water.

*Analysis.*—Calculated: 12.25% Cl, 14.50% N. Found: 12.10% Cl, 14.32% N.

In the same way, N-dodecyl-2,3-diaminobutane can be reacted with cyanogen chloride to form N-dodecyl-2-imino-4,5-dimethylimidazolidine chlorohydrate which also has similar biocidal properties.

EXAMPLE 3

*1-Dodecyl-2-Imino-3-Ethyl-Imidazolidine Bromohydrate*

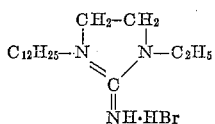

36 parts of N-ethyl-N'-dodecyl-1,2-diaminoethane (B.P.$_{14\text{ mm}}$. 190–198°; analysis: calculated 10.94% N, found 10.68 N), are dissolved in 200 parts of benzene and 15 parts of cyanogen bromide dissolved in 150 parts of benzene are added dropwise at boiling temperature. The solution is stirred for 2 hours at this temperature whereupon it turns a darker colour. The 1-dodecyl-2-imino-3-ethyl-imidazolidine bromohydrate is precipitated with petroleum ether, filtered off, dissolved in acetone and precipitated with ether. A white powder which dissolves completely in water is obtained. It melts at 101–103°.

*Analysis.*—Calculated: 22.1% Br. Found: 21.9% Br.

Because of its strongly bactericidal properties it can be used in antiseptic agents in a manner similar to the product described in Example 1.

N-ethyl-N'-dodecyl-1,2-diaminoethane is obtained by reacting N-dodecyl-ethanolamine sulphonic acid ester with ethylamine. In the same manner, instead of N-dodecyl-ethanolamine sulphonic acid ester, N-dodecyl-chlorethyl-amine chlorohydrate can be used, which reacted with excess ethylamine, forms the same starting material.

EXAMPLE 4

*1-Dodecyl-2-Imino-3-Methyl-Imidazolidine Chlorohydrate*

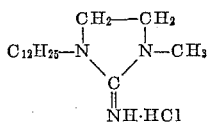

13 parts of cyanogen chloride are introduced over a period of 1½ hours into 47 parts of N-methyl-N'-dodecyl-1,2-diaminoethane dissolved in 100 parts of chlorobenzene, whereupon the base disappears and the reaction becomes weakly acid. The 1-dodecyl-2-imino-3-methyl-imidazolidine chlorohydrate formed in the reaction precipitates. After filtering off under suction, it is dissolved in acetone/alcohol and precipitated with ether. The white precipitate is filtered off and dried. The product completely dissolves in water and melts at 144–145°.

*Analysis.*—Calculated: 11.70% Cl. Found: 11.82% Cl.

Because of its good biocidal action, this substance can be used in antiseptic agents as described in Example 1.

1 - dodecyl - 2 - imino - 3 - butyl - imidazoline chlorohydrate (M.P. 87–88°) which dissolves very well in water, can be produced in a similar manner.

N - butyl - N' - dodecyl-1,2-diaminoethane (B.P.$_{11\text{ mm}}$. 190–210°) can be prduced from N-dodecyl-1,2-diaminoethane and butyl bromide in chlorobenzene.

*Analysis.*—Calculated: 9.87% N. Found: 9.88% N.

1 - tetradecyl - 2 - imino - 3 - methyl - imidazolidine chlorohydrate (M.P. 147–148°) is obtained from N-methyl-N'-tetradecyl-1,2-diaminoethane in the manner described above. This product also has good biocidal activity.

EXAMPLE 5

*1-Dodecyl-2-Imino-4,5-Tetramethylene-Imidazolidine Bromohydrate (Trans Compound)*

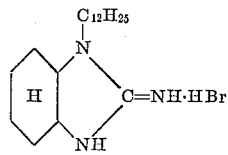

7.2 parts of cyanogen bromide dissolved in 70 parts of benzene are added dropwise at room temperature to a solution of 19 parts of trans N-dodecyl-1,2-diaminocyclohexane in 180 parts of benzene. The temperature of the mixture rises to 52° and it is stirred for three hours at this temperature. Animal charcoal is added to the solution which has become a dark colour; it is filtered and the benzene is distilled off in the vacuum. The residue is recrystallised from acetone/alcohol. Very beautiful white crystals which dissolve in water are obtained. They melt at 125°.

*Analysis.*—Calculated: 10.84% N, 20.60% Br. Found: 10.77% N, 20.20% Br.

The product has similarly strong bactericidal and fungicidal properties to that according to Example 1 and can be used, therefore, for the same purposes.

The trans-N-dodecyl-diaminocyclohexane can be produced as follows:

27.8 parts of trans 1,2-diaminocyclohexane (B.P.$_{11\text{ mm}}$. 187–190°) are heated to 160–170°, whereupon 20.5 parts of dodecyl chloride are added dropwise within about 1½ hours. The solution is stirred for 12 hours at this temperature, the diaminocyclohexane chlorohydrate formed is filtered off and the N-dodecyl-1,2-diaminocyclohexane is distilled in the vacuum, B.P.$_{11\text{ mm}}$.=214–220°

*Analysis.*—Calculated: 9.93% N. Found: 9.99% N.

The cis 1-dodecyl-2-imino-4,5-tetramethylene-imidazolidine bromohydrate (M.P. 98–99°) is obtained in a similar manner. The product dissolves completely in water and has similar fungicidal and bactericidal properties to the trans isomer. The cis N-dodecyl-1,2-diaminocyclohexane can be produced from the cis 1,2-diaminocyclohexane and dodecyl chloride in a similar manner.

EXAMPLE 6

*1-Tetradecyl-2-Imino-4,5-Tetramethylene-Imidazolidine Chlorohydrate (Trans Compound)*

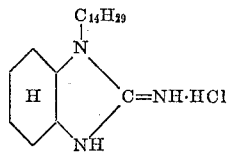

38 parts of trans N-tetradecyl-1,2-diaminocyclohexane, B.P.$_{11\text{ mm}}$. 234–246°; analysis: calculated 9.03% N, found 8.92% N), produced according to the process of Example 6 are dissolved in 250 parts of benzene and 8 parts of cyanogen chloride are introduced into this solution within about half an hour at room temperature. The base disappears and the reaction mixture has a slightly acid reaction. The 1-tetradecyl-2-imino-4,5-tetramethylene-imidazolidine chlorohydrate formed is precipitated with petroleum ether from the benzene solution and filtered off. The white product is recrystallised from ethyl acetate and then melts at 156–157°. It dissolves well in water.

*Analysis.*—Calculated: 11.33% N. Found: 11.1% N.

EXAMPLE 7

*1-Dodecyl-2-Imino-3-Methyl-4,5-Tetramethylene-Imidazolidine Chlorohydrate*

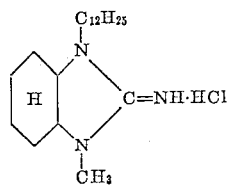

37 parts of trans N-methyl-N'-dodecyl-1,2-diaminocyclohexane are dissolved in 150 parts of benzene and 8 parts of cyanogen chloride are introduced into this solution. Part of the reaction product precipitates during the reaction. It is completely precipitated by the addition of petroleum ether in the form of a white precipitate which is filtered off. The product is recrystallised from acetone/alcohol and melts at 196–197°.

*Analysis.*—Calculated: 11.74% N, 9.93% Cl. Found: 11.6% N, 10.1% Cl.

Because of its good biocidal properties, this substance is suitable for the preparation of antiseptic agents.

The trans N-methyl-N'-dodecyl-1,2-diaminocyclohexane is produced from N-dodecyl aminocyclohexanol sulphuric acid ester and excess methylamine at 160–165°.

EXAMPLE 8

*2-Imino-1-Dodecyl-Hexahydropyrimidine Bromohydrate*

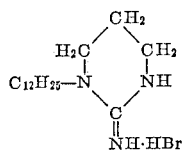

18 parts of N-dodecyl-1,3-diaminopropane are dissolved in 300 parts of benzene and 8 parts of cyanogen bromide, dissolved in 80 parts of benzene are added dropwise within 2 hours. The mixture is stirred for another 2 hours at boilin gtemperature. The dark solution is filtered and petroleum ether is added. The 2-imino-1-dodecyl-hexahydropyrimidine bromohydrate which precipitates is recrystallised from ethyl acetate; M.P. 80–81°. The product dissolves completely in water, has good bactericidal and algaecidal properties and can be used, therefore, as active ingredient in antiseptic agents.

*Analysis.*—Calculated: 12.08% N, 23.0% Br. Found: 11.78% N, 23.0% Br.

The corresponding chlorohydrate melts at 69–70°. 2-imino-1-tetradecyl-hexahydropyrimidine bromohydrate is obtained from N-tetradecyl-1,3-diaminopropane in a similar manner. The latter compound melts at 67–68°.

EXAMPLE 9

*1-Cyclohexyl-2-Imino-3-Dodecyl-Imidazolidine Chlorohydrate*

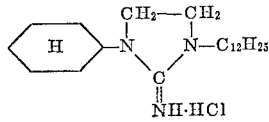

73 parts of N-cyclohexyl-N'-dodecyl-1,2-diaminoethane (B.P.$_{11}$ 228–233°) are dissolved in 500 parts of benzene. 14.5 parts of cyanogen chloride are introduced into this solution at room temperature. The 1-cyclohexyl-2-imino-3-dodecyl-imidazolidine chlorohydrate separates as a white powder. It is filtered off under suction and recrystallised from ethyl acetate. The purified product dissolves very easily in water and melts at 150–152°.

*Analysis.*—Calculated: 11.31% N, 9.55% Cl. Found: 11.12% N, 9.98% Cl.

In a similar manner, 1-cyclohexyl-2-imino-3-tetradecyl-imidazolidine bromohydrate can be produced from N-cyclohexyl-N'-tetradecyl-1,2-diaminoethane (B.P.$_{0.08}$ 178–182°) with cyanogen bromide. The product melts at 148–151°.

The starting materials, N-cyclohexyl-N'-dodecyl- or -tetradecyl-1,2-diaminoethane are obtained for example from N-(β-hydroxyethyl)-dodecyl- or -tetradecyl-amine by esterifying with sulphuric acid and condensing with cyclohexylamine.

Both imidazolidine derivatives have very good bactericidal and fungicidal activity and can be used, therefore, as disinfectants. They are active against, for example, the bacteria *Staphylococcus aureus, Staphylococcus albus, Escheria coli* and against the pathogenic fungus *C. interdigitalis.*

EXAMPLE 10

*1-Cyclohexyl-2-Imino-3-Dodecyl-Hexahydro-Pyrimidine Bromohydrate*

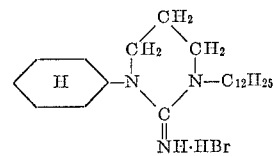

40 parts of N-cyclohexyl-N'-dodecyl-1,3-diaminopropane (B.P.$_{0.08}$ 182–186°) are boiled in 250 parts of chlorobenzene. A solution of 13 parts of cyanogen bromide in 85 parts of chlorobenzene is then added dropwise at boiling temperature over a period of three hours. On completion of the dropwise addition, the whole is stirred for another half hour at boiling temperature. A few undissolved particles are removed from the reaction mixture and the chlorobenzene is distilled off in the vacuum. The brown, resinous residue is dissolved in 100 parts of warm benzene and petroleum ether is added to the solution. The 1-cyclohexyl-2-imino-3 - dodecyl-hexahydropyrimidine bromohydrate precipitates, it is filtered off and recrystallised from 150 parts of acetone. The melting point of the pure product is 88–90°.

*Analysis.*—Calculated: 9.77% N, 18.6% Br. Found: 9.55% N, 19.0% Br.

1-cyclohexyl-2-imino-3-dodecyl-4,5 - tetramethylene-imidazolidine chlorohydrate (M.P. 174–175°) is obtained in an analogous manner from N-cyclohexyl-N'-dodecyl-1,2-diaminocyclohexane (B.P.$_{11}$ 256–262°) and cyanogen chloride.

The products dissolve completely in water and, because of their good bactericidal and algaecidal properties, they can be used as active ingredients in antiseptics.

EXAMPLE 11

*1-Dodecyl-2-Imino-Imidazolidine Bromohydrate*

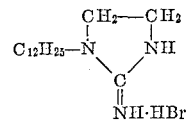

10 parts of ethylene guanidine, obtained by reacting ethylene diamine with cyanogen chloride, are dissolved in 150 parts of ethanol. 29 parts of dodecyl bromide (B.P.$_{12\text{ mm.}}$ 142–145°) are added while stirring and the solution is brought to the boil and boiled for another 8 hours while stirring. The solution is filtered and the ethanol is distilled off in the vacuum. Diethyl ether is added to the oily residue whereupon 1-dodecyl-2-imino-imidazolidine bromohydrate formed precipitates in the form of a white powder. The crystalline product is filtered off, again dissolved in acetone and precipitated with ether. M.P. 107–109°.

1-dodecyl-2-imino-imidazolidine chlorohydrate can be produced in a similar manner using 24.8 parts of dodecyl chloride and 0.3 part of iodine. It is obtained as a white powder which is easily soluble in water and melts at 119–120°. These products can be used as disinfectants.

EXAMPLE 12

*1-Dodecyl-2-Imino-4,5-Tetramethylene-Imidazolidine Bromohydrate*

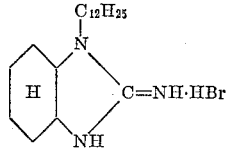

17.6 parts of cis 2-imino-4,5-tetramethylene-imidazolidine chlorohydrate (M.P. 78–80°; obtained from the reaction of cis 1,2-diaminocyclohexane with the stoichiometrical amount of cyanogen chloride), are dissolved in 200 parts of ethanol and 2.5 parts of metallic sodium are added. The solution is cooled and precipitated sodium chloride is filtered off. 25 parts of dodecyl bromide are added to the filtrate and the mixture is refluxed for some hours while stirring. The alcoholic solution of 1 - dodecyl - 2 - imino - 4,5 - tetramethylene - imidazolidine bromohydrate is concentrated in the vacuum and the residue is recrystallised from acetone. Melting point 97–99°. The product dissolves well in water and has excellent bactericidal and fungicidal properties.

EXAMPLE 13

*1-Dodecyl-2-Imino-3-Methyl-Tetrahydropyrimidine Bromohydrate*

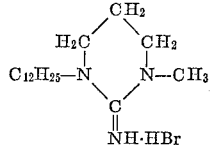

15 parts of 2-imino-1-methyl-tetrahydro-pyrimidine chlorohydrate (M.P. 145–146°; obtained by reacting 1-amino-3-methylamino-propane with the stoichiometrical amount of cyanogen chloride) are dissolved in 150 parts of ethanol and 2.3 parts of metallic sodium are added in portions. Sodium chloride formed is filtered off and 25 parts of dodecyl bromide are added to the filtrate. The mixture is then refluxed for some hours while stirring. The 1-dodecyl-2-imino-3-methyl-tetrahydro-pyrimidine bromohydrate is precipitated with diethyl ether and the precipitate is recrystallised from acetone. M.P. 118–119°. The product dissolves well in water and has a good bactericidal action.

EXAMPLE 14

*1-Tetradecyl-2-Imino-4,5-Dimethyl-Imidazolidine Bromohydrate*

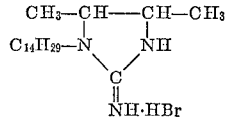

11.3 parts of 2-imino-4,5-dimethyl-imidazolidine (obtained from 2,3-diaminobutane with cyanogen chloride and treating the hydrochloride first obtained with sodium hydroxide) are dissolved in 150 parts of ethanol. 28 parts of tetradecyl bromide are added and the whole is stirred for 8 hours under reflux. The ethanol is then distilled off in the vacuum and the oily residue is rubbed with diethyl ester. White crystals of 1-tetradecyl-2-imino-4,5-dimethyl-imidazolidine bromohydrate are obtained which melt at 88–93° after dissolving in acetone and precipitating with diethyl ether.

The product dissolves easily in water and has strong biocidal properties.

EXAMPLE 15

*1-Dodecyl-2-Imino-3-Benzyl-Imidazolidine Bromohydrate*

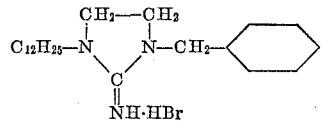

8.8 parts of caustic soda in 50 parts of water are added while cooling and stirring at 20–30° to a solution of 29 parts of 1-dodecyl-2-imino-imidazolidine chlorohydrate in 100 parts of water. 14 parts of benzyl chloride are added to the resultant suspension of 1-dodecyl-2-imino-imidazolidine in water and the whole is stirred briskly for 24 hours at room temperature. The reaction product is taken up in ether, the ethereal solution is washed with salt solution until the reaction is neutral to phenolphthalein paper and then dried over potash. After filtering the ethereal solution, hydrogen bromide is introduced whereupon 1-dodecyl-2-imino-3-benzyl-imidazolidine bromohydrate separates in liquid form. It solidifies on placing the vessel in an ice/sodium chloride solution. The product is filtered off, washed with ether and recrystallised from water; M.P. 116–117°. The product has very good bactericidal properties and can be used, therefore, for the production of disinfectants. It can also be admixed, as biocidal active ingredient, for example, in ointments, tinctures, antiseptic cleansers and cosmetics.

The same compound is obtained from N-dodecyl-N′-benzyl-ethylene diamine and cyanogen bromide according to the method described in Example 16. 1-tetradecyl-2-imino-3-benzyl-imidazolidine is obtained in a similar way from N-tetradecyl-N′-benzyl-1,2-diaminoethane with cyanogen bromide and 1-dodecyl-2-imino-3-benzyl-4,5-dimethyl-imidazolidine is obtained from N-dodecyl-N′-benzyl-2,3-diaminobutane.

EXAMPLE 16

*1-Dodecyl-2-Imino-3-(3′,4′-Dichlorobenzyl)-Imidazolidine Chlorohydrate*

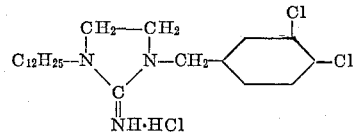

5 parts of cyanogen chloride are introduced at 20–30° into 28 parts of N-dodecyl-N′-(3′,4′-dichlorobenzyl)-ethylene diamine (B.P.$_{0.04-0.06}$ 200–208°) dissolved in 120 parts of benzene. The solution finally has a weakly acid reaction. On completion of this introduction, the whole is stirred for a further 2 hours at room temperature. The precipitation of the reaction product is completed by the addition of petroleum ether. The precipitate is filtered off and recrystallised from a mixture of acetone and alcohol; M.P. 136–137°.

*Analysis.*—Calculated: 9.41% N, 23.7% Cl. Found: 9.36% N, 23.7% Cl.

The product is soluble in water and has good bactericidal properties so that, like the product according to Example 1, it can be used for the production of disinfectants.

N-dodecyl-N′-(3,4-dichlorobenzyl)-ethylene diamine is produced in the following manner:

3,4-dichlorobenzaldehyde is added to 43 parts of N-dodecylethylene diamine in toluene and the whole is refluxed for some hours. The reaction water formed is removed and the toluene is distilled off in the vacuum. The remaining Schiff's base forms a yellow oil which gradually solidifies. The Schiff's base in abs. alcohol is hydrogenated at 70–80° and 120 atmospheres with Raney nickel as catalyst. After the theoretical amount of hydrogen has been taken up, the catalyst is filtered off from the alcoholic solution, the alcohol is distilled off and the remaining base is distilled in a high vacuum.

N - dodecyl - N'-(4'-chlorobenzyl)-ethylene diamine B.P.$_{0.03}$ 172–182°) can be produced in a similar manner. The 1-dodecyl-2-imino-3-(4'-chlorobenzyl)-imidazolidine chlorohydrate obtained therefrom with cyanogen chloride melts at 125–126° and has very good bactericidal and algaecidal properties which enable it to be used as biocidal active ingredient in disinfectants.

EXAMPLE 17

*1-(4'-Dodecylbenzyl)-2-Imino-Imidazoline Chlorohydrate*

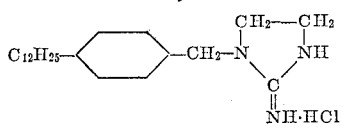

20 parts of N-(dodecylbenzyl)-ethylene diamine are dissolved in 150 parts of chlorobenzene and 5 parts of cyanogen chloride are introduced into this solution at room temperature. Finally, the reaction mixture has an acid reaction. It is stirred for some hours at the same temperature. The reaction product which precipitates is filtered off and recrystallised from a mixture of alcohol/acetone (M.P. 212–214°).

*Analysis.*—Calculated: 11.07% N. Found: 11.06% N.

N-(dodecylbenzyl)-ethylene diamine can be produced for example in a simple manner from dodecyl benzyl chloride and excess ethylene-diamine by methods known per se. B.P.$_{11}$ 238–248°.

*Analysis.*—Calculated: 8.8% N. Found: 8.6% N.

1-dodecylbenzyl-2-imino-3-methyl- or -3-ethyl- or -3-butyl-imidazolidine are obtained in a similar manner from N-(dodecylbenzyl)-N'-methyl or -N'-ethyl- or -N'-butyl-1,2-diaminoethane. These compounds also have a good bactericidal action.

EXAMPLE 18

*1-(4'-Dodecylbenzyl)-2-Imino-3-Benzyl-Imidazolidine Chlorohydrate*

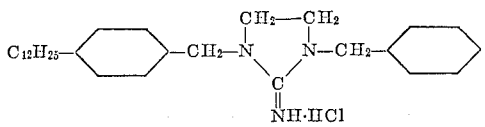

6 parts of cyanogen chloride are introduced at room temperature into 31 parts of N-dodecylbenzyl-N'-benzyl ethylene diamine dissolved in 120 parts of benzene whereupon the reaction of the solution becomes weakly acid. Petroleum ether is added to the benzene solution whereupon the reaction product precipitates in resinous form. This resin is again dissolved in benzene and precipitated with petroleum ether whereupon 1-dodecylbenzyl-2-imino-3-benzyl-imadazolidine chlorohydrate precipitates in granular form. After again dissolving in ethyl acetate and precipitating with petroleum ether, a pale yellow powder is obtained which dissolves easily in water and has good bactericidal activity. M.P. 156–158°.

*Analysis.*—Calculated: 8.94% N, 7.56% Cl. Found: 9.08% N, 7.7% Cl.

N-dodecylbenzyl-N'-benzylethylene diamine is produced according to the method described in Example 16 by converting N-(dodecylbenzyl)-ethylene diamine into the corresponding benzylidene compound with benzaldehyde and then hydrogenating in the presence of Raney nickel to give the desired starting material.

1-dodecylbenzyl - 2 - imino - 3-(4'-chlorobenzyl)-imidazolidine is obtained in a similar manner from N-dodecylbenzyl - N' - (4'-chlorobenzyl)-ethylene diamine. This compound also has good bactericidal properties.

EXAMPLE 19

*1-Dodecyl-2-Imino-3-Benzyl-4,5-Tetramethylene-Imidazolidine Chlorohydrate (Trans Compound)*

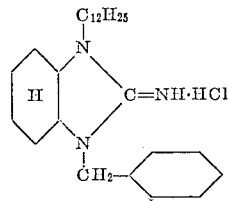

5 parts of cyanogen chloride are added at room temperature to 25 parts of trans N-dodecyl-N'-benzyl-1,2-diaminocyclohexane dissolved in 150 parts of benzene. The product is worked up as described in Example 16. The reaction product is recrystallised from acetone and then melts at 157–158°.

*Analysis.*—Calculated: 9.75% N, 8.25% Cl. Found: 9.61% N, 8.3% Cl.

1-tetradecyl - 2 - imino - 3 - benzyl-4,5-tetramethylene-imidazolidine chlorohydrate can be produced in a similar manner from trans N-tetradecyl-N'-benzyl-1,2-diaminocyclohexane with cyanogen chloride.

EXAMPLE 20

*1-Dodecyl-2-Imino-3-Benzyl-Hexahydropyrimidine Bromohydrate*

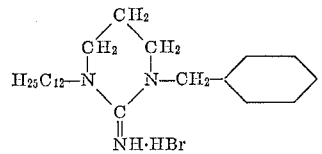

22 parts of N-dodecyl-N'-benzyl-1,3-diaminopropane (B.P.$_{0.05}$ 201–206°) are boiled in 120 parts of chlorobenzene. A solution of 7 parts of cyanogen bromide in 50 parts of chlorobenzene is added dropwise within 2½ hours at boiling temperature. The whole is kept boiling for a short time, the solution is then evaporated to a small volume and the reaction product is precipitated with petroleum ether. The resinous mass is dried in the vacuum and then recrystallised from 400 parts of ethyl acetate. 1-dodecyl-2-imino-3-benzyl-hexahydropyrimidine bromohydrate is obtained as a white powder which melts at 94–95°.

*Analysis.*—Calculated: 9.58% N, 18.25% Br. Found: 9.64% N, 18.34% Br.

EXAMPLE 21

*1-(4'-Dodecylbenzyl)-2-Imino-3-Cyclohexyl-Imidazolidine Chlorohydrate*

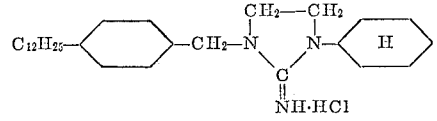

6 parts of cyanogen chloride are introduced at room temperature into 31 parts of N-dodecylbenzyl-N'-cyclohexyl ethylene diamine dissolved in 120 parts of benzene, whereupon the solution has a weakly acid reaction. Petroleum ether is added to the benzene solution and the reaction product precipitates in resinous form. This resin is again dissolved in benzene and precipitated with petroleum ether whereupon the 1-dodecylbenzyl-2-imino-3-cyclohexyl-imidazolidine chlorohydrate precipitates in granular form. M.P. 195–196°. After again dissolving in ethyl acetate and precipitating with petroleum ether, the product is obtained as a pale yellow powder.

N-dodecylbenzyl-N'-cyclohexylethylene diamine is obtained from 1-N-dodecylbenzylamino-2-hydroxyethane by esterifying with sulphuric acid and exchanging the ester group for the cyclohexylamino group by treating with excess cyclohexylamine.

A product having similar biocidal properties is obtained from trans N-dodecylbenzyl-N'-cyclohexyl-1,2-diamino-cyclohexane and cyanogen bromide.

In the form of their salts of strong acids, both products are soluble in water and, because of their good bactericidal and fungicidal properties, can be used in disinfectants.

EXAMPLE 22

*1-(4'-Dodecylbenzyl)-2-Imino-Imidazolidine Chlorohydrate*

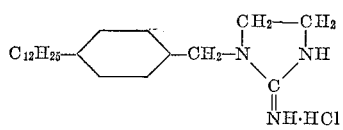

10 parts of 1,2-ethylene guanidine (obtained by reacting ethylene diamine with cyanogen chloride) are dissolved in 100 parts of ethanol and 35 parts of dodecylbenzyl chloride are added while stirring. The solution is brought to the boil and refluxed for several hours while stirring. The solution is then filtered and the 1-dodecylbenzyl-2-imino-imidazolidine chlorohydrate is precipitated with diethyl ether. To purify, it is recrystallised from a mixture of ethanol/acetone (1:1): M.P. of the chlorohydrate 212–214°. The product easily dissolves in water and has a good bactericidal and fungicidal action.

EXAMPLE 23

*1-(4'-Dodecylbenzyl)-2-Imino-Hexahydropyrimidine Bromohydrate*

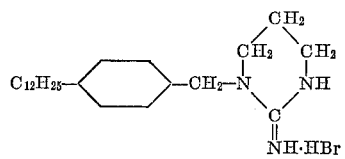

10.0 parts of 2-iminohexahydropyrimidine (obtained by reacting 1,3-diaminopropane with cyanogen bromide) are dissolved in 200 parts of butanol and 24 parts of 4'-dodecylbenzyl bromide are added. The solution is brought to the boil and refluxed for 8 hours while stirring. The butanol is then distilled off under reduced pressure and the residue is stirred with 200 parts of diethyl ether. The precipitate is filtered off under suction and recrystallised from a mixture of ethanol/acetone (1:1). 1-(4'-dodecylbenzyl)-2-imino-hexahydropyrimidine bromohydrate is obtained in the form of white crystals which melt at 150–152°.

The bromohydrate dissolves very easily in water and has a strong biocidal action.

The present application is a continuation-in-part of applications Serial No. 702,518, filed December 13, 1957 (now abandoned), and Serial No. 702,824, filed December 16, 1957 (now abandoned).

What we claim is:
1. A compound of the formula

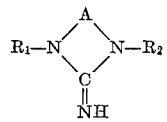

wherein A is alkylene which completes the heterocyclic nucleus selected from the group consisting of the imidazolidine and hexahydropyrimidine nuclei, $R_1$ is a lipophilic radical selected from the group consisting of dodecylbenzyl and alkyl with 12 to 14 carbon atoms, and $R_2$ is a member selected from the group consisting of hydrogen, lower alkyl, cyclohexyl, benzyl and chlorobenzyl, the lower alkyl having from 1 to 2 carbon atoms.

2. The compound of the formula

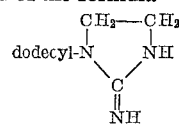

3. The compound of the formula

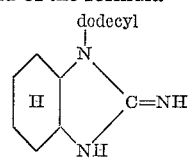

4. The compound of the formula

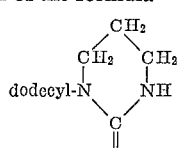

5. The compound of the formula

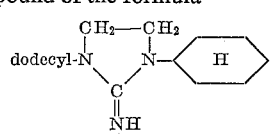

6. The compound of the formula

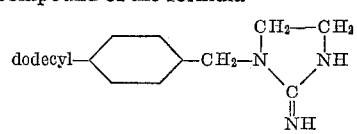

7. The compound of the formula

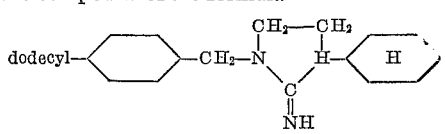

8. An organic material having an adherent coating of a compound of the formula

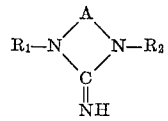

wherein A is alkylene which completes the heterocyclic nucleus selected from the group consisting of the imidazolidine and hexahydropyrimidine nuclei, $R_1$ a lipophilic radical selected from the group consisting of dodecylbenzyl and alkyl with 12 to 14 carbon atoms, and $R_2$ is a member selected from the group consisting of hydrogen, lower alkyl, cyclohexyl, benzyl and chlorobenzyl, the lower alkyl having from 1 to 2 carbon atoms, whereby the said material is protected against bacteria.

References Cited in the file of this patent

UNITED STATES PATENTS

| | | |
|---|---|---|
| 1,962,109 | Alvord | June 5, 1934 |
| 2,285,410 | Bousquet et al. | June 9, 1942 |
| 2,422,899 | Curd et al. | June 24, 1947 |
| 2,689,249 | De Benneville et al. | Sept. 14, 1954 |
| 2,748,120 | Burtner | May 29, 1956 |
| 2,999,047 | Model et al. | Sept. 5, 1961 |

OTHER REFERENCES

Richter's Organic Chemistry, vol. IV, pages 4–5 (1947).
Elderfield et al.: Jour. Org. Chem., vol. 14, pp. 605–637 (1949).
Chemical Abstracts, Formula Index, 5th Decennial Index, vol. 41–50, page 957f (1947–1956).
Watanabe: Chemical Abstracts, vol. 50, col. 15928 (1956).